United States Patent
Sorenson et al.

(10) Patent No.: US 9,454,415 B2
(45) Date of Patent: *Sep. 27, 2016

(54) COMMUNICATION FAILURE SOURCE ISOLATION IN A DISTRIBUTED COMPUTING SYSTEM

(71) Applicant: International Business Machines Corporation, Armonk, NY (US)

(72) Inventors: Todd C. Sorenson, Tucson, AZ (US); Liang Hua Wu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 14/074,636

(22) Filed: Nov. 7, 2013

(65) Prior Publication Data

US 2014/0258790 A1    Sep. 11, 2014

Related U.S. Application Data

(63) Continuation of application No. 13/794,019, filed on Mar. 11, 2013, now Pat. No. 9,146,791.

(51) Int. Cl.
| | |
|---|---|
| *G06F 11/00* | (2006.01) |
| *G06F 11/34* | (2006.01) |
| *G06F 11/07* | (2006.01) |
| *H04L 12/24* | (2006.01) |
| *H04L 12/26* | (2006.01) |

(52) U.S. Cl.
CPC ......... *G06F 11/006* (2013.01); *G06F 11/076* (2013.01); *G06F 11/079* (2013.01); *G06F 11/0709* (2013.01); *G06F 11/0757* (2013.01); *G06F 11/34* (2013.01); *H04L 41/064* (2013.01); *H04L 41/0677* (2013.01); *H04L 43/16* (2013.01)

(58) Field of Classification Search
USPC ....................................................... 714/47.2
See application file for complete search history.

(56) References Cited

U.S. PATENT DOCUMENTS

| | | | |
|---|---|---|---|
| 6,353,898 B1 | 3/2002 | Wipfel et al. | |
| 6,959,403 B2* | 10/2005 | Dierauer | H04L 41/0677 714/47.2 |
| 7,290,177 B2* | 10/2007 | Kagawa | H04N 1/0001 714/39 |
| 7,302,608 B1* | 11/2007 | Acharya | G06F 11/2041 714/13 |

(Continued)

OTHER PUBLICATIONS

Cho, "Scalable Techniques for Failure Recovery and Localization", University of Arizona, 2011, 101 pp.

(Continued)

*Primary Examiner* — Sarai Butler
(74) *Attorney, Agent, or Firm* — William K. Konrad; Konrad Raynes Davda & Victor LLP

(57) ABSTRACT

In accordance with one aspect of the present description, an indication that a communication failure reported in a predetermined time interval is more likely the result of a software failure than a hardware failure may be made if the number of communication links reporting a communication failure in the predetermined time interval exceeds a communication link failure threshold, and the number of communication link devices such as nodes or communication paths which have been implicated as causing a communication failure, exceeds an implicated device threshold. Other features and aspects may be realized, depending upon the particular application.

7 Claims, 6 Drawing Sheets

(56) References Cited

U.S. PATENT DOCUMENTS

| | | | |
|---|---|---|---|
| 7,363,528 B2 * | 4/2008 | Chan | H04L 63/1433 714/4.3 |
| 7,496,784 B1 | 2/2009 | Peterson et al. | |
| 8,082,340 B2 | 12/2011 | Filsfils et al. | |
| 8,208,370 B1 * | 6/2012 | Mitchell, Jr. | H04L 41/0659 370/217 |
| 2001/0048660 A1 * | 12/2001 | Saleh | H04J 14/0295 370/216 |
| 2011/0255418 A1 | 10/2011 | van Greunen et al. | |
| 2012/0008506 A1 | 1/2012 | Astigarraga et al. | |
| 2013/0232382 A1 * | 9/2013 | Jain | H04L 41/069 714/48 |

OTHER PUBLICATIONS

U.S. Appl. No. 13/794,019, filed Mar. 11, 2013, entitled "Communication Failure Source Isolation in a Distributed Computing System", invented by T.C. Sorenson et al., 36 pp. [18.485 (Appln)].

* cited by examiner

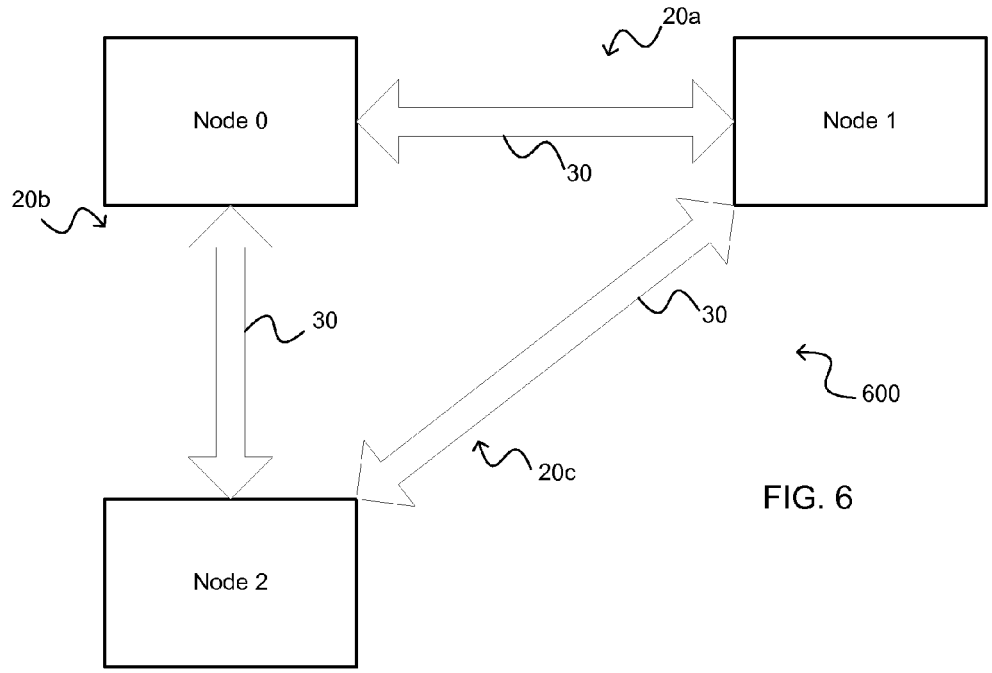

FIG. 6

| ERROR TYPE | CASE NUMBER | COMM. LINK 20a | COMM. LINK 20b | COMM. LINK 20c | COMM. FAILURE ISOLATION/ IMPLICATION |
|---|---|---|---|---|---|
| All Link Failure | Case A | Failure | Failure | Failure | Local Software Failure |
| Single Link Failure | Case B | Failure | Good Response | Good Response | Node 0, Node 1 |
| | Case C | Good Response | Failure | | Node 0, Node 2 |
| | Case D | Good Response | Good Response | Failure | Node 1, Node 2 |
| Dual Link Failure | Case E | Failure | Failure | Good Response | Node 0 |
| | Case F | Good Response | Failure | Failure | Node 2 |
| | Case G | Failure | Good Response | Failure | Node 1 |
| No Error | Case H | Good Response | Good Response | Good Response | None |

FIG. 7

COMMUNICATION FAILURE SOURCE ISOLATION IN A DISTRIBUTED COMPUTING SYSTEM

CROSS-REFERENCE TO RELATED APPLICATION

This application is a continuation of U.S. patent application No. 13/794,019, filed Mar. 11, 2013, which application is incorporated herein by reference in its entirety.

TECHNICAL FIELD

This description relates in general to distributed computing systems, and more particularly, to a method, system and computer program product for facilitating communication failure source isolation in a distributed computing system.

BACKGROUND

In order to provide for high-throughput of work, or nearly continuous availability, distributed computing systems are often utilized. A distributed computing system typically includes two or more computing devices which frequently operate somewhat autonomously and communicate with each other over a network or other communication path.

A computing device of a distributed computing system that has the capability of sharing resources is often referred to as a cluster which has two or more nodes, each node having a processor or at least a processor resource, and typically, a separate operating system. One example of a distributed computing system utilizing one or more clusters is a storage area network (SAN) which includes a storage controller.

A storage area network is frequently used to couple computer storage devices such as disk arrays, tape libraries, optical jukeboxes or other storage devices, to hosts in a manner which permits the storage devices to appear to the operating systems of the hosts as locally attached to the hosts. In operation, a host may request data from a storage controller which may in turn retrieve the data from one or more storage devices. The host may also transmit data to the storage controller to be written to one or more storage devices.

Each host communicates with the storage controller through a channel or communication path of the storage area network. Each communication path typically includes one or more physical hardware communication channels such as a digital electronic communication bus, a digital optical communication bus, or a similar communication channel. In addition, each communication path may include one or more logical control blocks, addresses, communication devices, digital switches, and the like for coordinating the transmission of digital messages between the host and the storage controller. Fibre Channel (FC) is often used in storage area networks and is a high speed networking technology in which signals may be transmitted over various transmission media including fiber optic cable or twisted pair copper cables, for example.

A storage controller may have multiple servers which are assigned input/output (I/O) tasks by the hosts. The servers are typically interconnected as nodes of one or more clusters in a distributed computing system, in which each node includes a server often referred to as a central electronics complex (CEC) server.

The I/O tasks may be directed to specific volumes in the storage. The storage controller may further have multiple input/output (I/O) adapters such as host adapters which enable the servers to communicate with the hosts, and device adapters which enable the servers of the storage controller to communicate with the storage devices. Switches may be used to couple selected servers to selected I/O adapters of the storage controller.

A distributed computing system is often referred to as a multi-node environment in which the various nodes communicate with each other by communication paths which link the various nodes together. Thus, in a cloud environment, the nodes of the distributed computing system may include hosts, in a network communication environment, the nodes of the distributed computing system may include servers, in a storage environment, the nodes of the distributed computing system may include storage facilities and embedded devices, and so on. Each pair of nodes and the communication path linking the pair of nodes to each other for communication between the two nodes of the pair, is referred to herein as a communication link.

In these environments, each node is typically a computing device installed with an operating system running software applications, including communication applications by which a node can learn the status of some or all of the communication links in the distributed computing system. For example, a node may transmit a "heartbeat" message to another node and wait to receive a corresponding heartbeat message from that node in return. If nodes fail to communicate with each other, there could be a bad node or a bad communication path linking the nodes. In some distributed computing system, all nodes of the system report the good or bad status of each communication link monitored by the nodes to a common node which may perform a communication failure isolation process to identify the particular node or communication path which has failed, resulting in the communication failure.

Various techniques have been proposed for identifying the particular node or communication path which is the cause of the communication failure. For example, in one technique, a thread generated by a monitor function on one node may loop through all nodes that it is monitoring to detect "node timeouts" which occur if the difference between the current time and the time of the last heartbeat message received from a particular node by the monitoring node is greater than a threshold value assigned to the particular node by the monitoring node. If the threshold is exceeded for a particular node being monitored, the monitoring node declares that particular node to be "dead" or failed.

SUMMARY

The present description is directed to operations for receiving within a predetermined time interval at least one report of at least one communication failure in a distributed computing system having a plurality of communication links, each communication link comprising a pair of nodes and a communication path linking the pair of nodes for communication between the nodes of the pair. In one aspect of the present description, the operations include determining how many communication links have reported communication failure within the predetermined time interval, and determining how many devices of the communication links reporting communication failure within the predetermined time interval, are implicated as causing a communication failure within the predetermined time interval.

In another aspect, operations include indicating that communication failure reported in the predetermined time interval is more likely the result of a software failure than a hardware failure, if the number of communication links reporting a communication failure in the predetermined time interval exceeds a communication link failure threshold, and the number of devices implicated as causing a communication failure exceeds an implicated device threshold.

In other aspects, each threshold may be a function of the number of nodes in the communication links in the distributed computing system. In one embodiment, the communication link failure threshold may have the value of two and the implicated device threshold may have the value of one. In such an embodiment, the indicating operation includes indicating that communication failure reported in the predetermined time interval is more likely the result of a software failure than a hardware failure if more than two communication links report a communication failure within the predetermined time interval and more than one device of the communication links reporting a communication failure is implicated as causing a communication fault.

In yet another aspect, operations include implicating a particular node as a cause of communication failure reported in the predetermined if the number of communication links reporting a communication failure in the predetermined time interval is two and the particular node is common to both of the two communication links. Still another aspect is directed to incrementing a device failure counter for a particular node each time the particular node is implicated as a cause of communication failure, and indicating a likely hardware failure at the particular node if a device failure threshold is exceeded by the device failure counter for the particular node.

In one embodiment of the present description, the operations further include, if the number of communication links reporting a communication failure in the predetermined time interval is one, incrementing a device failure counter at each node of the one communication link, and indicating a likely hardware failure at the particular node of the one communication link if a device failure threshold is exceeded by the device failure counter for the particular node. In yet another aspect, a communication link reporting a communication failure may include a node of a communication link reporting a response time out in waiting for a response to a communication sent to the other node of the communication link.

Other features and aspects may be realized, depending upon the particular application.

BRIEF DESCRIPTION OF THE DRAWINGS

FIG. 6 illustrates another example of a computing environment which may employ a distributed computing system having communication failure source isolation in accordance with one aspect of the present description.

FIG. 7 illustrates a table depicting various cases of communication failure source isolation in accordance with one aspect of the present description.

DETAILED DESCRIPTION

Figure 1:
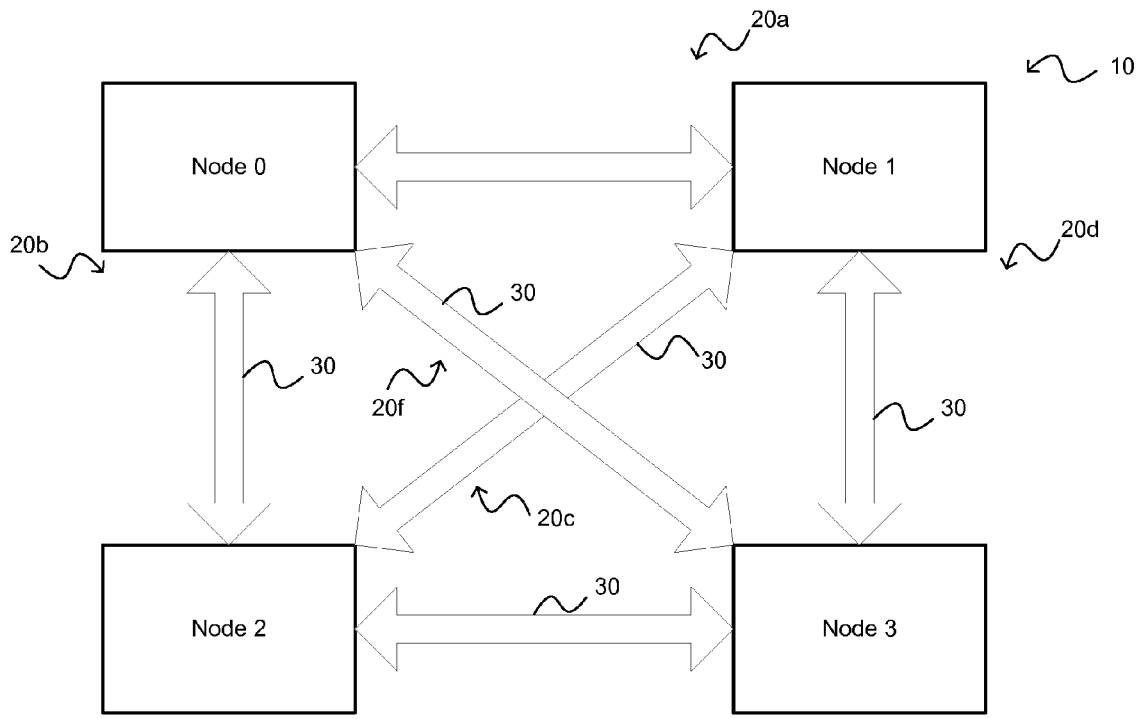
FIG. 1 illustrates an example of a computing environment which may employ a distributed computing system having communication failure source isolation in accordance with one aspect of the present description.

FIG. 1 shows a graphical representation of one example of a distributed computing system 10 in which communication failure source isolation in accordance with one embodiment of the present description may be employed. A distributed computing system in accordance with the present description may include a plurality of nodes 0-3, for example, which may be provided by various data processing units or computing devices including clusters, controllers, embedded devices and other programmed or dedicated processors. Although the distributed computing system 10 depicts four nodes 0-3, it is appreciated that the number of nodes may be greater or fewer in number, depending upon the particular application.

In this example, the primary function of the distributed computing system 10 is to provide a data processing function such as, for example, data storage, data backup, data retrieval, data deduplication, data mining, data capture, data archiving, data replication, bandwidth reduced data replication, encryption of data, etc. Other data processing functions may be provided, depending upon the particular application.

In accordance with one aspect of the present description, in the event of a communication failure of the distributed computing system 10, isolation of the source of communication failure includes determining how many communication links of the communication links 20a-20f have reported a communication failure within a predetermined time interval. In the illustrated embodiment, each communication link 20a-20f comprises a pair of nodes of the nodes 0-3 and a communication path 30 linking the pair of nodes for communication between the nodes of the pair. Thus, the communication link 20a comprises the pair of nodes 0 and node 1, and the communication path 30 linking the two nodes, node 0 and node 1. Similarly, the communication link 20c comprises the pair of nodes node 1 and node 2, and the communication path 30 linking the two nodes, node 1 and node 2.

In accordance with another aspect of the present description, isolation of the source of communication failure further includes determining how many devices of the communication links reporting communication failure within the predetermined time interval, are implicated as causing a communication failure within the predetermined time interval. In the illustrated embodiment, a communication link device includes a communication path such as the communication paths 30, and a node such as the nodes 0-3 of the communication links 20a-20f.

As explained in greater detail below, in one embodiment, an indication that a communication failure reported in the predetermined time interval is more likely the result of a software failure than a hardware failure may be made if the number of communication links reporting a communication failure in the predetermined time interval exceeds a communication link failure threshold, and the number of communication link devices such as nodes or communication paths which have been implicated as causing a communication failure, exceeds an implicated device threshold. Thus, if a software failure has been indicated as the likely source of the communication failure, it is deemed more likely that a bug in the communication code operating in the communication devices of distributed computing system, is the source of the communication failure rather than a hardware failure in any communication devices implicated as causing the communication failure. As a result, unnecessary repairs or replacements to communication devices may be reduced or eliminated in some applications. It is appreciated that in other applications, other features or advantages may be realized, depending upon the particular application.

In the illustrated embodiment, a suitable interval of time for receiving reports of communication failure may be measured as a few seconds, a few minutes, a few hours, or fractions or multiples thereof, for example. Thus, the duration of a suitable interval of time for receiving communication failure reports may vary, depending upon the particular application.

Figure 2:
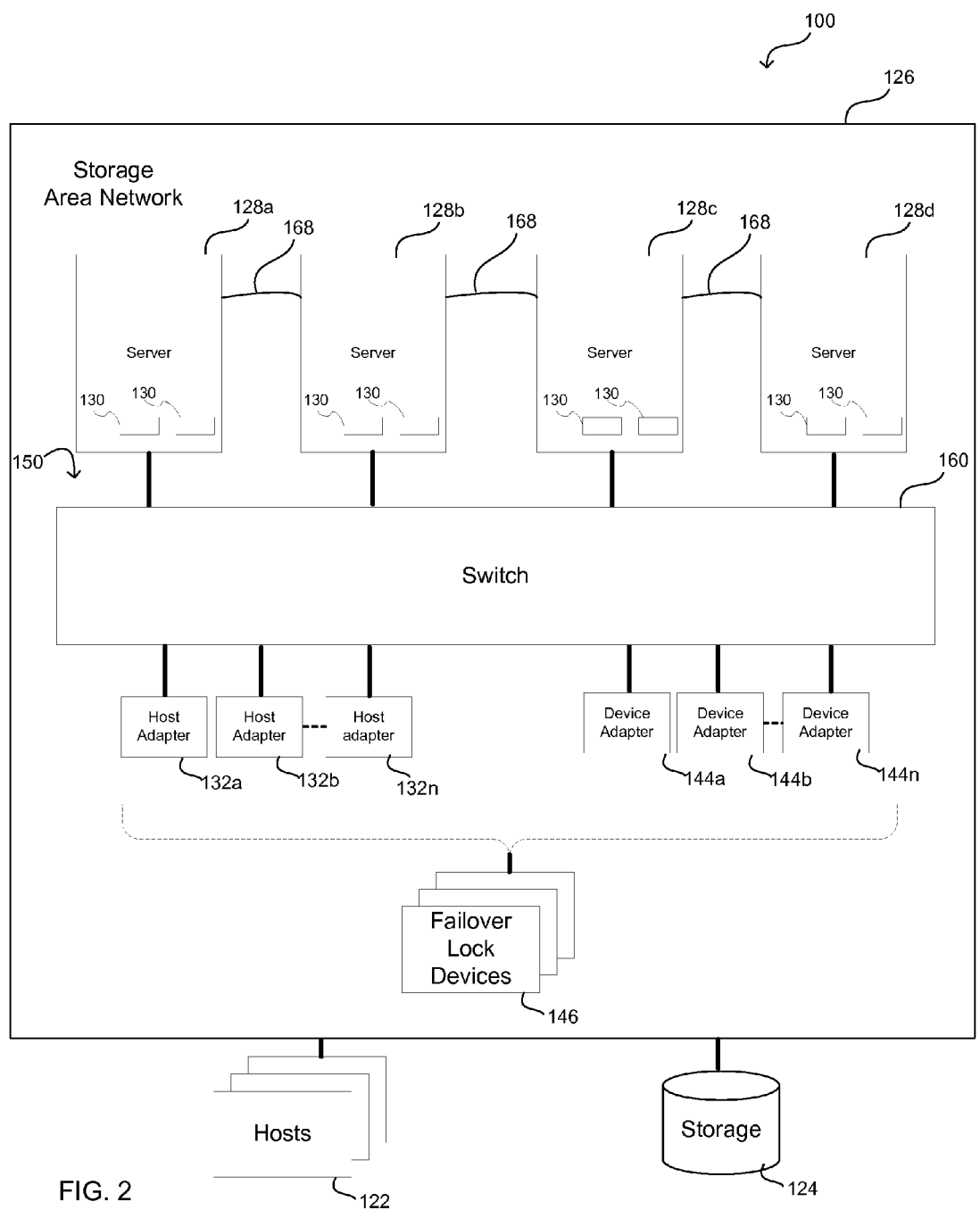
FIG. 2 illustrates another example of a computing environment which may employ a distributed computing system having communication failure source isolation in accordance with an aspect of the present description.

FIG. 2 shows another example of a distributed computing system 100 in which communication failure source isolation in accordance with one embodiment of the present description may be employed. In the environment of FIG. 2, one or more hosts 122 communicate Input/Output (I/O) tasks or other processing requests directed to a storage 124, through a storage area network 126 which manages access to the storage 124. Each host 122 and each storage device 124 may be a node of the distributed computing system 100.

In one embodiment, the storage area network 126 also includes a plurality of nodes which in this example, includes servers 128a, 128b, 128c, 128d. Each server 128a, 128b, 128c, 128d may be a CEC server which may include one or more processor nodes 130 which share resources and collaborate with each other in performing system tasks. Although the storage area network 126 is depicted as including four servers 128a-128d, for purposes of illustration, it is appreciated that the number of servers or other nodes may be greater or lesser, depending upon the particular application. Similarly, it is appreciated that the number of processor nodes 130 in each server 128a, 128b, 128c, 128d may vary, depending upon the particular application.

Each server 128a, 128b, 128c, 128d may have one or more central processing units (CPUs) in which the processing as well as the memory and other resources of the server may be apportioned into physical or logical partitions (often referred to as a "virtual server"), each of which is capable of running an individual copy of an operating system and performing the service functions of a "server". Hence, each processor node 130 is capable of independently performing data processing functions assigned to that processor node.

Thus, as used herein, the term "server" may be used to refer to a physical server or a logical partition or virtual server performing a server function. Each logical partition separately executes an operating system and device drivers. The logical partitions comprise a division of the processors into logically independent but cooperating processing systems each having their own operating systems and device drivers. Multiple logical partitions may execute in each server 128a-128d, managed by a supervisor module for that server 128a-128d.

Each device driver provides an interface between the operating system in the logical partition in which the device driver executes, and a device, such as an I/O adapter including host adapters 132a, 132b . . . 132n, and device adapters 144a, 144b . . . 144n. Each I/O adapter may, like the servers 128a-128d, hosts 122 and storage 124, be a node of the distributed computing system 100.

The host adapters 132a, 132b . . . 132n, enable the servers 128a-128d to communicate with the hosts 122. The device adapters 144a, 144b . . . 144n enable the servers 128a-128d to communicate with the storage 124. Thus, the servers 128a-128d share devices, such as adapters 132a, 132b . . . 132n, 144a, 144b . . . 144n. Here, the variable "n" is used to represent a variable number of an element, may indicate any number of instances of the element, and may indicate different integer numbers when used with different elements or when used with different instances of the same element. For instance, 132n, 144n, may indicate the same or different number of host adapters 132n, and device adapters 144n.

Access to the various shared devices is controlled by one or more failover lock devices 146. Thus, should a node such as the server 128a wish to access a host adapter such as the adapter 132a, a request is transmitted by the server 128a over a communication path to the appropriate failover lock device 146. If the failover lock device grants the request, the server 128a then "owns" the host adapter 132a and is free to utilize the resources of the host adapter 132a. Conversely, the other nodes such as the servers 128b, 128c and 128d are blocked or "locked out" from access to the host adapter 132a until the server 128a releases the lock controlling access to the host adapter 132a by transmitting a suitable release signal to the failover lock device 146 providing the failover lock which controls access to the host adapter 132a. Each failover lock device 146 is an embedded device which like the I/O adapters, servers 128a-128d, hosts 122 and storage 124, may be a node of the distributed computing system 100.

The servers 128a-128d communicate with the host adapters 132a, 132b . . . 132n, and the device adapters 144a, 144b . . . 144n, over a fabric 150. The fabric 150 may comprise one or more interfaces providing communication paths between the servers 128a-128d and adapters. A communication path comprises the physical hardware in the fabric 150 that enables communication with shared adapters and lock devices over the fabric.

Each server 128a-128d may be assigned a portion of the adapters 132a, 132b . . . 132n, 144a, 144b . . . 144n during initialization. In the example of FIG. 1, the fabric 150 may include a switch 160 which facilitates sharing of the adapters 132a, 132b . . . 132n, 144a, 144b . . . 144n by each of the servers 128a-128d. The servers 128a-128d may be assigned to handle I/O requests directed to specific volumes configured in the storage 124. The servers 128a-128d communicate over communication paths 168 enabling processor inter-communication to manage configuring operations performed with respect to the shared devices, such as the shared adapters 132a, 132b . . . 132n, 144a, 144b . . . 144n. The switch 160 may also be an embedded device providing a node of the distributed computing system 100/

Figure 3:
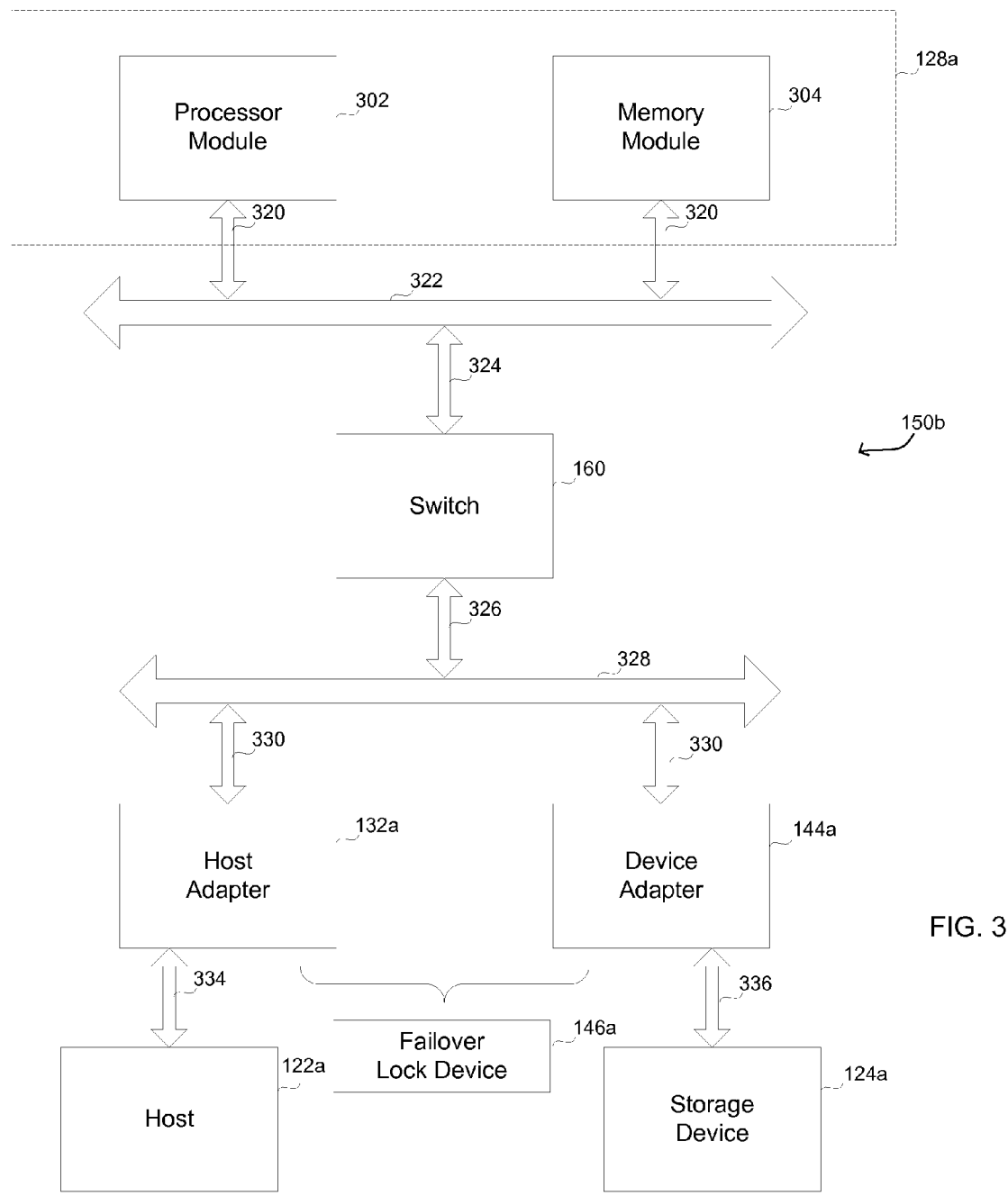
FIG. 3 illustrates an example of a node of the distributed computing system of FIG. 2 which may employ communication failure source isolation in accordance with an aspect of the present description.

FIG. 3 shows one example of a server node of a distributed computing system having ownership and therefore access to shared resource nodes including host adapters and device adapters. In this example, the server node is a CEC server 128a which includes a processor module 302, and a memory module 304. As previously mentioned, a server may have multiple server partitions, each partition having a physical or virtual processor module 302 and memory module 304 as depicted in FIG. 3.

The memory module 304 stores software instructions and data. The processor module 302 executes the software instructions and manipulates the data in various operations depending upon the particular application. In the illustrated embodiment, the processor module 302 has communicated with a lock device controlling the shared resources, the host adapter 132a and device adapter 144a in this example, and its request to hold the lock for those shared resources has been granted by the lock device. Accordingly, the processor module 302 has been assigned "ownership" of those shared resources and has exclusive access to those shared resources. Access by other nodes to the host adapter 132a and device adapter 144a, is blocked.

The processor module 302 communicates with a host 122a and a storage device 124a through those shared resources over the fabric 150, a portion of which is indicated at 150b. The fabric 150b includes suitable communication paths 320, 322, 324, 326, 328 and 330 which permit the server 128a to communicate with the shared resource adapters assigned to the server 128a, which are, in this example, the host adapter 132a and device adapter 144a. The fabric 150b further may include suitable switches and other fabric devices such as the switch 160.

A host 122a coupled by a communication path 334 to the host adapter 132a assigned to the server 128a, communicates with the server 128a over the communication path 334 and host adapter 132a. Similarly, a storage device 124a coupled by a communication path 336 to the device adapter 144a assigned to the server 128a, communicates with the server 128a over the communication path 336 and the device adapter 144a. In the illustrated embodiment, the servers 128a, 128b, 128c, 128d provide an interface between the communication paths 334 coupled to the hosts 122, and the communication paths 336 coupled to the storage devices 124. Thus, the communication paths 334 to the hosts 122 may be based upon a particular host attachment protocol such as FICON, for example, and the communication paths 335 may be based upon the Fibre Channel protocol, for example. Other communication paths of the fabric 150b may comprise for example, a Fibre Channel arbitrated loop configuration, a serial loop architecture or a bus interface, such as a Peripheral Component Interconnect (PCI) interface such as a PCI-Express interface. The communication paths of the fabric 150b may also be part of an Ethernet network, for example, such that each node has an individual network (internet protocol) address. Other types of communication paths may be utilized, such as a modem telephone path, wireless network, etc., depending upon the particular application.

In the illustrated embodiment, communication hardware associated with the communication paths between the nodes includes switches, routers, cables, modems, adapters, power supplies, etc. Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
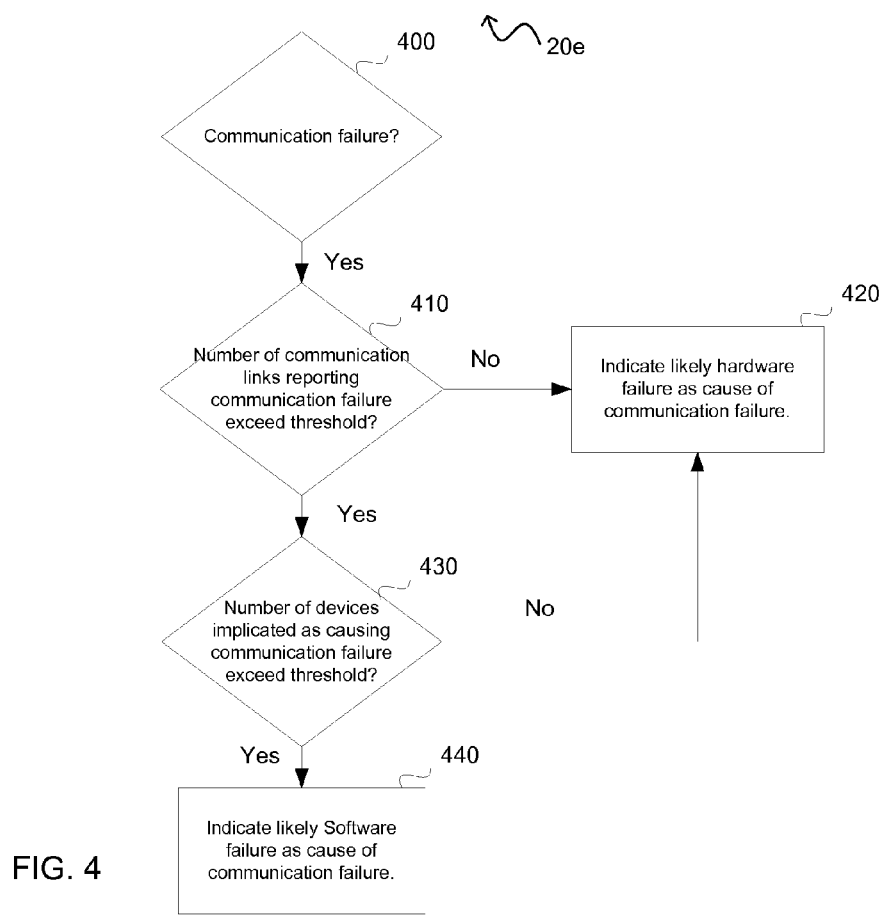
FIG. 4 depicts an example of operations for communication failure source isolation in accordance with one aspect of the present description.

FIG. 4 depicts an example of operations for communication failure source isolation in accordance with one embodiment of the present description. In one operation, a communication failure may be detected (block 400) in a distributed computing system such as the system 10 of FIG. 1, for example. Thus, a node such as node 0 may receive, for example, at least one report of at least one communication failure in the distributed computing system 10.

In another operation, it may be determined (block 410) how many communication links have reported communication failure within a predetermined interval of time, for example, and whether that number of communication links exceeds a communication link failure threshold. In one embodiment, the communication link failure threshold may be selected as a function of the number of nodes in the distributed computing system. In a distributed computing system having four nodes such as that depicted in FIG. 1, a communication link failure threshold of two (2) may be selected, for example. If so, and if the number of communication links reporting a communication failure within the predetermined time interval is one or two (less than or equal to the threshold), for example, the communication failure source may be isolated and indicated (block 420) as more likely a hardware failure than a software failure. As explained in greater detail below, the particular hardware device which likely suffered a hardware failure may be identified for further monitoring and possible repair or replacement as appropriate.

Conversely, if the number of communication links reporting a communication failure within the predetermined time interval exceeds (block 410) the communication link failure threshold, that is, exceeds two link failures in this example, a further determination (block 430) may be made as to how many communication devices such as nodes or communication paths of the communication links reporting communication failure within the predetermined time interval are implicated as causing a communication failure within the predetermined time interval, and whether that number of implicated communication devices exceeds an implicated device threshold. In one embodiment, the implicated device threshold may be selected as a function of the number of nodes in the distributed computing system. In a distributed computing system having four nodes such as that depicted in FIG. 1, an implicated device threshold of one (1) may be selected, for example. If so, and if the number of communication devices implicated as causing a communication failure is one, for example, the communication failure source may be isolated and indicated (block 420) as more likely a hardware failure than a software failure.

Conversely, if the number of communication devices implicated as causing a communication failure is two or more, for example, the communication failure source may be isolated and indicated (block 440) as more likely a software failure than a hardware failure. As explained in greater detail below, the communication software may be identified for further monitoring and possible debugging and reloading as appropriate.

Figure 5:
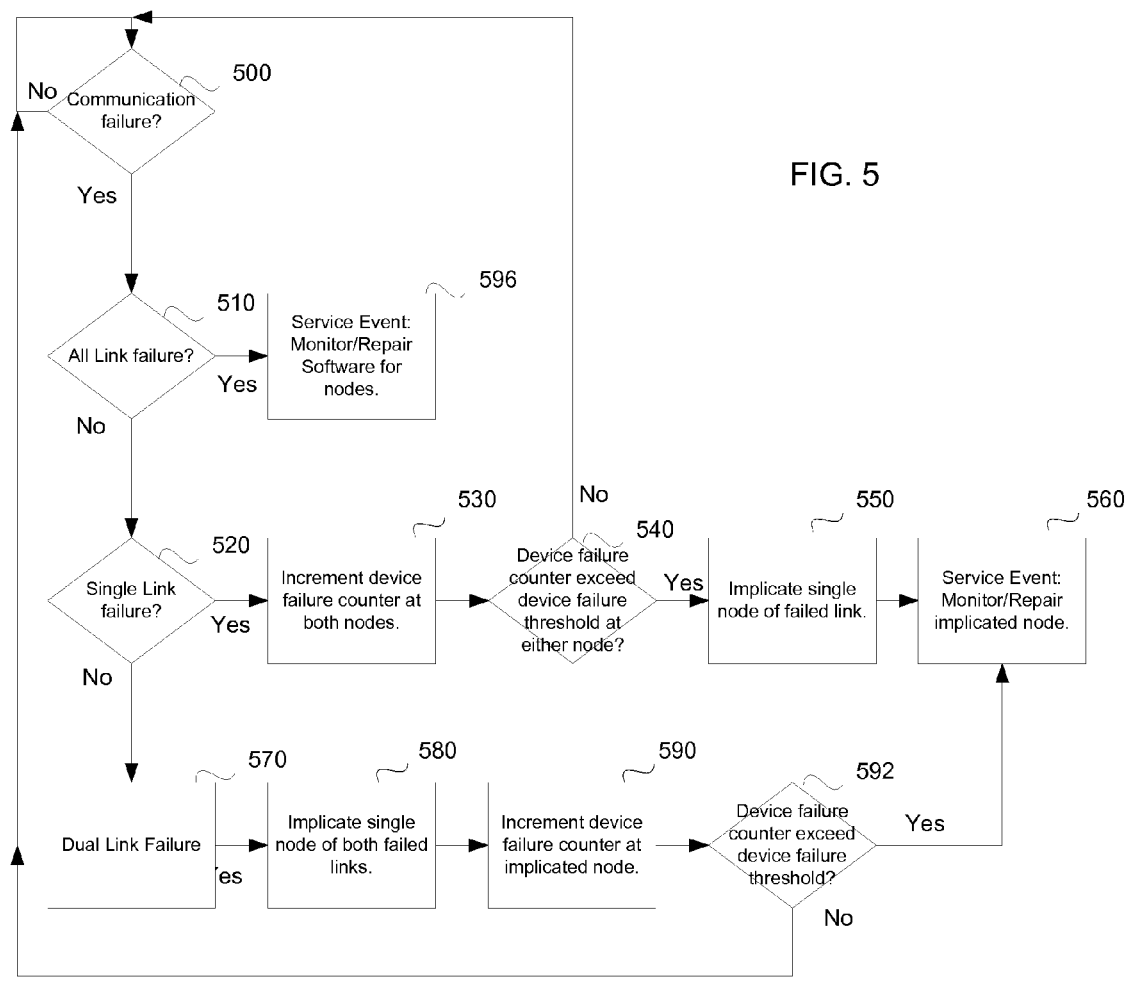
FIG. 5 depicts another example of operations for communication failure source isolation in accordance with another aspect of the present description.

FIG. 5 depicts another example of operations for communication failure source isolation in accordance with an embodiment of the present description. In one operation, a communication failure may be detected (block 500) in a distributed computing system such as the system 600 of FIG. 6, for example, having three nodes, node 0, node 1 and node 2. FIG. 7 depicts a table identifying 8 cases, designated Case A-H, respectively, in which one or more communication links of the distributed computing system 600 may report communication failure in various combinations of the communication links 20a-20c. Thus, Case B, for example, is directed to a single link failure in which communication link 20a has reported communication failure. Accordingly, in Case, B, communication links 20b and 20c report good responses to communication tests or at least do not report communication failures.

In another operation, it may be determined (block 510) whether all three communication links 20a, 20b, 20c links have reported communication failure within a predetermined interval of time, for example. If not, another determination (block 520) is made as to whether there has been a single communication link failure. Thus, in Case B, only communication link 20a has reported a communication failure.

To detect a communication failure, in one embodiment, a node may periodically send a "heartbeat" message to another node over a communication path linking those two nodes and wait for a response. In some embodiments, a timer may be set to indicate when a response is overdue. Thus, in Case B, if node 0 determines that no response has been received from node 1 within the time period in response to a heartbeat message sent to node 1 over communication link 20a, there could be a hardware problem within communication link 20a. Thus, there may be a malfunctioning node such as node 0 failing to properly send the heartbeat message to node 1, node 1 failing to respond to the heartbeat message from node 0, or a malfunctioning communication path 30 within communication link 20a.

In one embodiment, to identify the likely source of a single link communication failure, device failure counters may be initialized at each node. When a communication link such as the communication link 20a experiences a single link communication failure (block 520), the device failure counters at both node 0 and node 1 of the communication link 20a may be incremented (block 530). Each time that a node is involved in a communication link failure, the device failure counter for that node may be incremented.

If the counter on a particular node of the communication link 20a reaches (block 540) a device failure threshold, that node may be implicated (block 550) as the likely source of the single link communication failure on communication link 20a. In addition a service event may be initiated (block 560). In connection with the service event, the implicated node may be monitored for further failures and its communication hardware eventually repaired or replaced if sufficient additional failures are noted. Alternatively, the communication hardware of the implicated node may be repaired or replaced immediately.

In some embodiments, the device failure thresholds may be set differently for the two nodes of the communication link reporting the failure. Thus, for example, if node 0 is deemed to be more likely to fail due to various factors than is node 1, the device failure threshold for node 1 may be set higher than that of node 0 so that the device failure counter of node 0 is more likely to reach its lower device failure threshold before node 1 reaches its higher device failure threshold.

A single link communication failure over communication link 20b (Case C) or communication link 20c (Case D) operate in a similar manner as a single link communication failure over communication link 20a (Case B) as described above. If it is determined (block 520) that a single link communication failure has not occurred, then it is determined (block 570) that a dual link communication failure has occurred. Case E, for example, is directed to a dual link failure in which communication links 20a and 20b have both reported communication failure at the same time. Accordingly, in Case E, communication link 20c reports good responses to communication tests or at least does not report communication failures. As used herein, a dual link failure is deemed to have occurred when communication failures occur in two communication links at the same time, that is, either simultaneously or within a predetermined time period.

Thus, in Case E, if node 0 reports response timeouts against both node 1 and node 2 indicating communication failures over both communication links 20a, 20b, it is deemed that node 0 is more likely to be experiencing a hardware failure than the hardware of either node 1 or node 2, or either of the communication paths 30 of the communication links 20a and 20b. For example, if node 0 is experiencing a hardware failure, communication over both communication links 20a and 20b may be disrupted resulting in a dual link communication failure. Conversely, if node 0 is not the source of the communication failures over both communication link 20a and communication link 20b, it would indicate multiple hardware failures occurring in the nodes 1 and 2 or the communication paths 30 of communication links 20a, 20b, which are occurring at the same time, that is, either simultaneously or sufficiently close in time (that is within a predetermined time period) to cause a dual link communication failure. Of the two possibilities, it is deemed more likely that a hardware failure has occurred in the single node 0 which is common to both communication links 20a, 20b of the dual link failure, than that multiple hardware failures have occurred at the same time across a hardware boundary, that is, in separate hardware devices of the communication links 20a, 20b. Accordingly, node 0 is implicated (block 580) as the likely source of the hardware failure causing the dual link communication failure.

Here too, the device failure counter at node 0 of the communication links 20a and 20b may be incremented (block 590). If the counter on node 0 reaches (block 592) a device failure threshold set for that node, a service event may be initiated (block 560). Again, in connection with the service event, the implicated node (node 0 in Case E) may be monitored for further failures and its communication hardware eventually repaired or replaced if sufficient additional failures are noted. Alternatively, the communication hardware of the implicated node may be repaired or replaced immediately. A dual link communication failure over communication links 20b and 20c (Case F) or communication links 20a and 20c (Case G) operates in a similar manner as a dual link communication failure over communication links 20a and 20b (Case E) as described above.

Case A in FIG. 7 refers to a scenario in which it is determined (block 510) that all three communication links 20a, 20b and 20c have experienced a communication failure. As used herein, an all link failure for a three node system is deemed to have occurred when communication failures occur in the three communication links at the same time, that is, either simultaneously or within a predetermined time period.

In accordance with one aspect of the present description, it is appreciated that if all three communication links in a three node system report communication failures, no single node or communication path is common to all three communication links 20a, 20b and 20c. Hence, if all three communication links in a three node system report communication failures, it is unlikely that a single hardware failure such as a hardware failure in a single communication device such as a single node or a single communication path is the likely source of the three communication failures. Accordingly, if more than two communication links in a three-node distributed computing system such as the system 600 depicted in FIG. 6 report response timeout at the same time, more than one communication device is implicated as a source of communication failure. However, it is believed that instances of two communication devices separately experiencing hardware failure at the same time is relatively rare. Accordingly, it is deemed that software failure (block 596) is the more likely cause of the communication failure in all three communication links.

Thus, in the illustrated embodiment, a communication link failure threshold for a three node system such as that depicted in FIG. 6 may be set at two communication link failures occurring at the same time. Moreover, an implicated device threshold may be set at one for a three node system such as that depicted in FIG. 6. Accordingly, if all three communication links report a communication failure (block 510) in a three node system, both the communication link failure threshold (block 410, FIG. 4) and the implicated device threshold (block 440, FIG. 4) are deemed to have been exceeded and a software service event (block 560) is initiated.

A software service event indicates that the source of the communication failure in all three communication links is likely a "bug" or programming error in the communication software operating on the nodes and communication paths. For example, a programming error related to communication protocols may have been made in the communication software of the distributed computing system 600. Such a programming error may result in, for example, data packets becoming corrupted during transferring between nodes over communication paths. It is appreciated that other types of communication programming errors may occur, depending upon the particular application.

In connection with the software service event, the implicated software may be monitored for further failures and eventually debugged or replaced if sufficient additional failures are noted. Once the software has been corrected, the operating systems of the nodes of the distributed computing system 600 may be reinitialized as appropriate. Alternatively, the implicated software may be debugged or replaced immediately.

Accordingly, it is believed that by isolating the source of the communication failure as a software error rather than a hardware failure, unnecessary repair or replacement of hardware equipment may be reduced or eliminated in some applications. It is appreciated that other features or advantages may be realized, depending upon the particular application.

In another aspect of the present description, the communication failure source isolation described above in connection with a three-node system such as that depicted in FIG. 6 may be extended to an n-node system where n>1. It is appreciated herein that once the isolation operations implicate more than one hardware component or node in a multiple link failure, it is deemed that the source of the communication failure is more likely that a software programming error rather than being the result of multiple hardware failures occurring at the same time over a hardware boundary.

For example, FIG. 1 depicts a four-node system which may be subdivided into two three-node subsets, the first subset comprising node 0, node 1 and node 2, the second subset comprising node 0, node 1 and node 3. In this example, it is assumed that three communication links, links 20a, 20b and 20d report communication failures. By application of the operations described above in connection with a three-node system, if links 20a and 20b of the first subset (nodes 0, 1 and 2) report communication failure, node 0 (Case E, FIG. 7) is implicated as a source of the communication failure. Similarly, if links 20a and 20d of the second subset (nodes 0, 1 and 3) report communication failure, node 1 is implicated as a source of the communication failure. Since the isolation operations implicate more than one hardware component or node (that is, both nodes 0 and 1) across a hardware boundary, it is deemed that the source of the communication failure is more likely a software programming error rather than being the result of multiple hardware failures occurring at the same time in different hardware areas.

Thus, in the illustrated embodiment, a communication link failure threshold for a four-node system such as that depicted in FIG. 1 may be set for example, at two communication link failures occurring at the same time. Moreover, an implicated device threshold may be set at one, for example, for a four-node system such as that depicted in FIG. 1. Accordingly, if three communication links report a communication failure in a four-node system, the communication link failure threshold (block 410, FIG. 4) is exceeded. Further if more than one communication device is implicated as a communication failure source, the implicated device threshold (block 440, FIG. 4) is also deemed to have been exceeded and a software service event (block 560) is initiated. Again, unnecessary repair or replacement of hardware may be reduced or eliminated. The isolation operations described herein may be extended to distributed computing systems have additional nodes (n nodes) in a similar manner.

Figure 8:
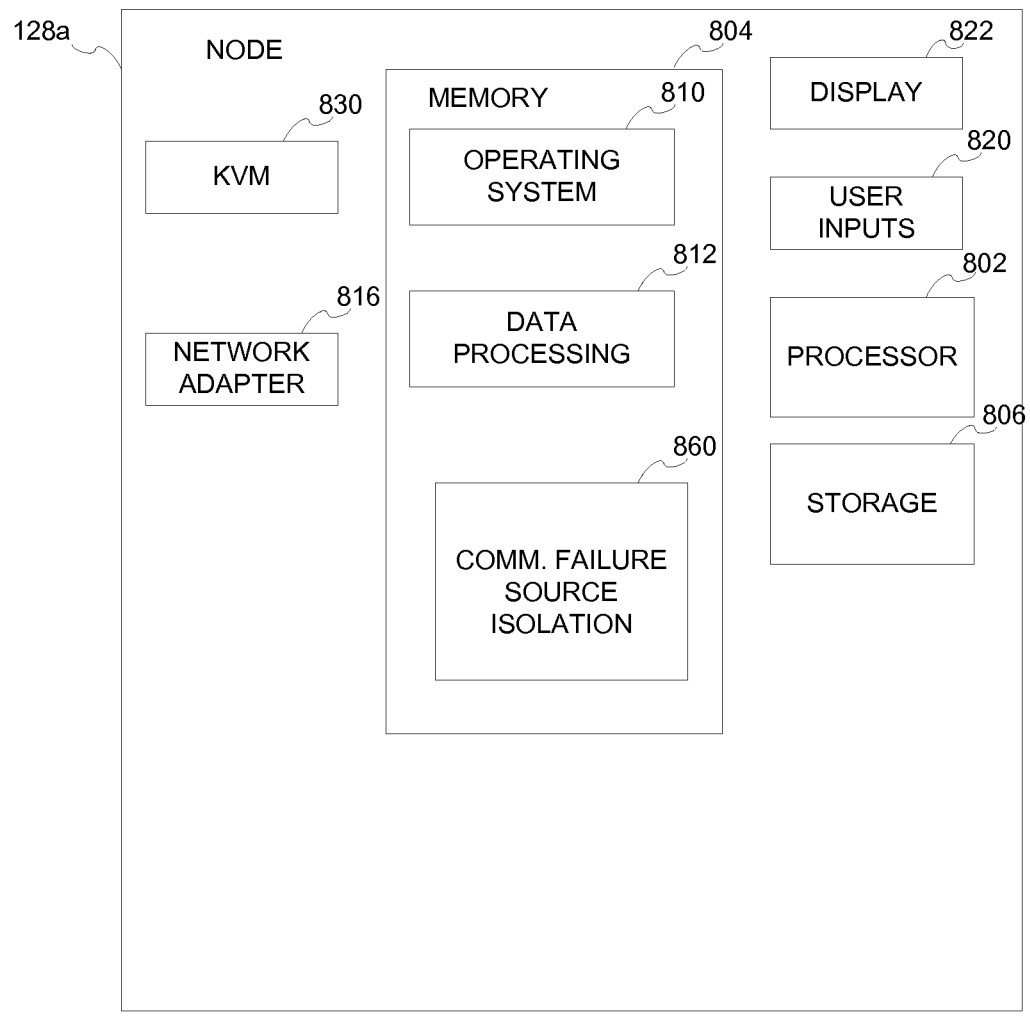
FIG. 8 illustrates an example of a node of a distributed computing system having communication failure source isolation in accordance with one aspect of the present description.

FIG. 8 illustrates one embodiment of a node of a distributed computing system such as the storage area network 126 of FIG. 2. In this embodiment, the node is a server node such as the CEC server node 128a. However, it is appreciated that the node of FIG. 8 may comprise any suitable computing device, such as a mainframe, server, personal computer, laptop, handheld computer, telephony device, network appliance, virtualization device, storage controller, failover lock device, embedded device, etc.

It is appreciated that the nodes of a distributed computing system may perform a variety of data processing functions such as data storage and management in disk arrays, for example. Thus, the node of FIG. 8 may perform data processing tasks such as data backup, data deduplication, data mining data capture, data archiving, data replication, bandwidth reduced data replication, encryption of data, etc and typically involve the transfer of large amounts of data between the hosts 122 and storage 124 (FIG. 2).

The node may include a processor 802 (e.g., a microprocessor), a memory 804 (e.g., a volatile memory device), and storage 806 (e.g., a non-volatile storage, such as magnetic disk drives, optical disk drives, a tape drive, flash storage etc.). The storage 806 may comprise an internal storage device or an attached or network accessible storage. Programs in the storage 806 are loaded into the memory 804 and executed by the processor 802 as represented by an operating system 810 and data processing programs 812. Programs 860 are also provided in the memory 804 for communication failure source isolation in accordance with the present description.

The node further includes a network controller or adapter 816 to enable communication with a network such as an Ethernet, a Fibre Channel Arbitrated Loop, etc. which interconnects the nodes of the distributed computing system. The network controller or adapter 816 may also enable communication with a network path to a host 122 or communication with a network path to storage 124.

User input devices 820 provide user input to the processor 802, and may include a keyboard, mouse, pen-stylus, microphone, touch sensitive display screen, or any other suitable activation or input mechanism. Output devices 822 are capable of rendering information transmitted from the processor 802, or other component, such as a display monitor, printer, storage, etc. The input devices 820, and output devices 822 may be coupled directly to a node using a suitable KVM (keyboard, video, mouse) switch 830 in some applications.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, an application specific integrated circuit (ASIC), a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present description may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present description are described above with reference to flowchart illustrations and/or block diagrams of methods, apparatus (systems) and computer program products according to embodiments of the description. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present description(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present description.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present description need not include the device itself.

The illustrated operations of FIGS. 4, 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the description has been presented for the purposes of illustration and description. It is not intended to be exhaustive or to limit the description to the precise form disclosed. Many modifications and variations are possible in light of the above teaching. It is intended that the scope of the description be limited not by this detailed description, but rather by the claims appended hereto. The above specification, examples and data provide a complete description of the manufacture and use of the composition of the description. Since many embodiments of the description may be made without departing from the spirit and scope of the description, the invention resides in the claims herein after appended.

What is claimed is:

1. A method, comprising:
   receiving within a predetermined time interval from at least one communication link at least one report of at least one communication failure in a distributed computing system having a plurality of communication links, each communication link comprising a pair of nodes and a communication path linking the pair of nodes for communication between the nodes of the pair;
   determining how many communication links have reported communication failure within the predetermined time interval;
   determining how many devices of the communication links reporting communication failure within the predetermined time interval are implicated as causing a communication failure within the predetermined time interval; and
   indicating that communication failure reported in the predetermined time interval is more likely the result of a software failure than a hardware failure if the number of communication links reporting a communication failure in the predetermined time interval exceeds a communication link failure threshold and the number of devices implicated as causing a communication failure exceeds an implicated device threshold.

2. The method of claim 1 wherein each threshold is a function of the number of nodes in the communication links in the distributed computing system.

3. The method of claim 1 wherein the communication link failure threshold has the value of two and the implicated device threshold has the value of one wherein the indicating includes indicating that communication failure reported in the predetermined time interval is more likely the result of a software failure than a hardware failure if more than two communication links report a communication failure within the predetermined time interval and more than one device of the communication links reporting a communication failure is implicated as causing a communication fault.

4. The method of claim 1 further comprising implicating a particular node as a cause of communication failure reported in the predetermined time interval if the number of communication links reporting a communication failure in the predetermined time interval is two and the particular node is common to both of the two communication links.

5. The method of claim 4 further comprising incrementing a device failure counter for a particular node each time the particular node is implicated as a cause of communication failure, and indicating a likely hardware failure at the particular node if a device failure threshold is exceeded by the device failure counter for the particular node.

6. The method of claim 1 further comprising, if the number of communication links reporting a communication failure in the predetermined time interval is one, incrementing a device failure counter at each node of the one communication link, and
   indicating a likely hardware failure at a node of the one communication link if a device failure threshold is exceeded by the device failure counter for the particular node.

7. The method of claim 1 wherein a communication link reporting a communication failure includes a node of a communication link reporting a response time out in waiting for a response to a communication sent to the other node of the communication link.

* * * * *